United States Patent
Aliseychik et al.

(10) Patent No.: US 8,923,315 B2
(45) Date of Patent: Dec. 30, 2014

(54) PACKET ROUTER HAVING A HIERARCHICAL BUFFER STRUCTURE

(71) Applicant: LSI Corporation, San Jose, CA (US)

(72) Inventors: Pavel Aleksandrovich Aliseychik, Moscow (RU); Elyar Eldarovich Gasanov, Moscow (RU); Ilya Vladimirovich Neznanov, Moscow (RU); Pavel Anatolyevich Panteleev, Moscow (RU); Andrey Pavlovich Sokolov, Moscow (RU)

(73) Assignee: LSI Corporation, San Jose, CA (US)

( * ) Notice: Subject to any disclaimer, the term of this patent is extended or adjusted under 35 U.S.C. 154(b) by 160 days.

(21) Appl. No.: 13/777,629

(22) Filed: Feb. 26, 2013

(65) Prior Publication Data

US 2014/0023085 A1  Jan. 23, 2014

(30) Foreign Application Priority Data

Jul. 18, 2012 (RU) .................................. 2012130778

(51) Int. Cl.
*H04L 12/28* (2006.01)
*H04L 12/861* (2013.01)
*H04L 12/933* (2013.01)

(52) U.S. Cl.
CPC .............. *H04L 49/90* (2013.01); *H04L 49/103* (2013.01); *H04L 49/9047* (2013.01)
USPC ......................................................... 370/412

(58) Field of Classification Search
None
See application file for complete search history.

(56) References Cited

U.S. PATENT DOCUMENTS

| | | |
|---|---|---|
| 6,321,311 B1 | 11/2001 | Kim |
| 6,507,629 B1 | 1/2003 | Hatakeyama |
| 6,748,560 B2 | 6/2004 | Hatakeyama |
| 6,813,445 B2 | 11/2004 | Fukashiro et al. |
| 6,819,630 B1 | 11/2004 | Blackmon et al. |
| 7,228,483 B2 | 6/2007 | Kuwahara |
| 7,397,808 B2 | 7/2008 | Lee et al. |
| 7,530,011 B2 | 5/2009 | Obuchii et al. |
| 7,603,509 B1 | 10/2009 | Wik |
| 7,631,243 B2 | 12/2009 | Nieto |
| 7,734,989 B2 | 6/2010 | Kutz et al. |

(Continued)

OTHER PUBLICATIONS

Briffa, Johann, "Interleavers for Turbo Codes," Master of Philosophy Dissertation, Dept. of Communications and Computer Engineering, University of Malta, Oct. 1999 (130 pages).

(Continued)

*Primary Examiner* — Ian N Moore
*Assistant Examiner* — Brian T Le (57) ABSTRACT

A packet-router architecture in which buffer modules are interconnected by one or more interconnect fabrics and arranged to form a plurality of hierarchical buffer levels, with each higher buffer level having more buffer modules than a corresponding lower buffer level. An interconnect fabric is configured to connect three or more respective buffer modules, with one of these buffer modules belonging to one buffer level and the other two or more buffer modules belonging to a next higher buffer level. A buffer module is configured to implement a packet queue that (i) enqueues received packets at the end of the queue in the order of their arrival to the buffer module, (ii) dequeues packets from the head of the queue, and (iii) advances packets toward the head of the queue when the buffer module transmits one or more packets to the higher buffer level or to a respective set of output ports connected to the buffer module.

14 Claims, 2 Drawing Sheets

(56) References Cited

U.S. PATENT DOCUMENTS

| | | | |
|---|---|---|---|
| 7,917,830 | B2 | 3/2011 | Hsieh |
| 7,994,818 | B2 | 8/2011 | Lee et al. |
| 8,006,024 | B2 | 8/2011 | Brocco et al. |
| 8,089,959 | B2 | 1/2012 | Szymanski |
| 8,107,779 | B2 | 1/2012 | Pnini et al. |
| 8,171,186 | B1 | 5/2012 | Karguth et al. |
| 2002/0012356 | A1* | 1/2002 | Li et al. .................. 370/423 |
| 2003/0112817 | A1* | 6/2003 | Woo et al. ................ 370/413 |
| 2013/0125097 | A1* | 5/2013 | Ebcioglu et al. ........... 717/136 |

OTHER PUBLICATIONS

Batcher, K. E., "Sorting Networks and their Applications," Proceeding AFIPS '68 (Spring) Proceedings of the Apr. 30-May 2, 1968, Spring Joint Computer Conference, pp. 307-314.

Hui, Joseph Y., et al., "A Broadband Packet Switch for Integrated Transport," IEEE Journal on Selected Areas in Communications, vol. SAC-5, No. 8, Oct. 1987, pp. 1264-1273.

Yeh, Yu-Shuan, et al., "The Knockout Switch: A Simple, Modular Architecture for High-Performance Packet Switching," IEEE Journal on Selected Areas in Communications, vol. SAC-5, No. 8, Oct. 1987 pp. 1274-1280.

Devault, Michel, et al., "The "Prelude" ATD Experiment: Assessments and Future Prospects," IEEE Journal on Selected Areas in Communications, vol. 6, No. 9, Dec. 1988, pp. 1528-1537.

Tüchler, Michael, et al., "Turbo Equalization: Principles and New Results," IEEE Transactions on Communications, vol. 50, No. 5, May 2002, pp.

* cited by examiner

PACKET ROUTER HAVING A HIERARCHICAL BUFFER STRUCTURE

Packet switching is a communications method that handles transmitted data in suitably sized blocks, referred to as "packets." In its representative form, a packet may have a destination address and one or more payload bits that are to be delivered to that address. A packet router is an apparatus that transports sequences of packets from a set of input ports or nodes, over a shared routing infrastructure, to a set of output ports or nodes. Specific implementations of the routing infrastructure depend on the type of physical packet carrier (e.g., electrical or optical) used in the packet router and may include various adapters, signal converters, interconnect fabrics, routing switches, packet buffers, controllers, schedulers, etc.

One example of a packet router is an interleaver configured to rearrange packets in a received set of packets according to a specified packet-permutation scheme, without repeating or omitting any of the packets in the set, wherein the payload of a packet can be a symbol, a word, or a bit-set consisting of one or more bits. Another example of a packet router is a de-interleaver configured to reverse the rearrangement imposed by the corresponding interleaver. Interleavers and/or de-interleavers are used, e.g., for (i) error-correction coding in data transmission, disk storage, and computer memory; (ii) multiplexing/de-multiplexing for transport of data over shared media and for streaming video and audio applications; and (iii) non-contiguous storage patterns in disk storage and interleaved memory for improved performance in accessing the physical storage medium. Representative examples of the use of interleavers and de-interleavers in turbo encoders, equalizers, and decoders are disclosed, e.g., in U.S. Pat. Nos. 7,917,830, 7,734,989, 7,631,243, 7,530,011, 7,228,483, and 6,819,630, all of which are incorporated herein by reference in their entirety.

In a representative configuration, a packet router may be presented with two or more packets arriving at the input ports at the same time while being destined for a common output port. The packet router is typically designed to recognize this conflict (or contention) between the packets and resolve it, e.g., by temporarily storing or buffering one or more of the contending packets within the router's internal structure. This temporary storage usually causes the packet router to have a variable delay and a variable throughput, both of which depend on the applied traffic load and its characteristics. When configured to receive the same traffic load and pattern, different packet-router designs may exhibit different latency characteristics, with some of the packet-router designs outperforming the others.

Disclosed herein are various embodiments of a packet-router architecture in which buffer modules are interconnected by one or more interconnect fabrics and arranged to form a plurality of hierarchical buffer levels, with each higher buffer level having more buffer modules than a corresponding lower buffer level. An interconnect fabric is configured to connect three or more respective buffer modules, with one of these buffer modules belonging to one buffer level and the other two or more buffer modules belonging to a next higher buffer level. A buffer module is configured to implement a packet queue that (i) enqueues received packets at the end of the queue in the order of their arrival to the buffer module, (ii) dequeues packets from the head of the queue, and (iii) advances packets toward the head of the queue when the buffer module transmits one or more packets to the higher buffer level or to a respective set of output ports connected to the buffer module. Advantageously, this packet-router architecture can be used to design a packet router that is specifically tailored to meet the requirements of a desired packet-router application, with the ability to achieve a sensible trade-off between the router's performance characteristics and the router's implementation complexity.

Figure 1:
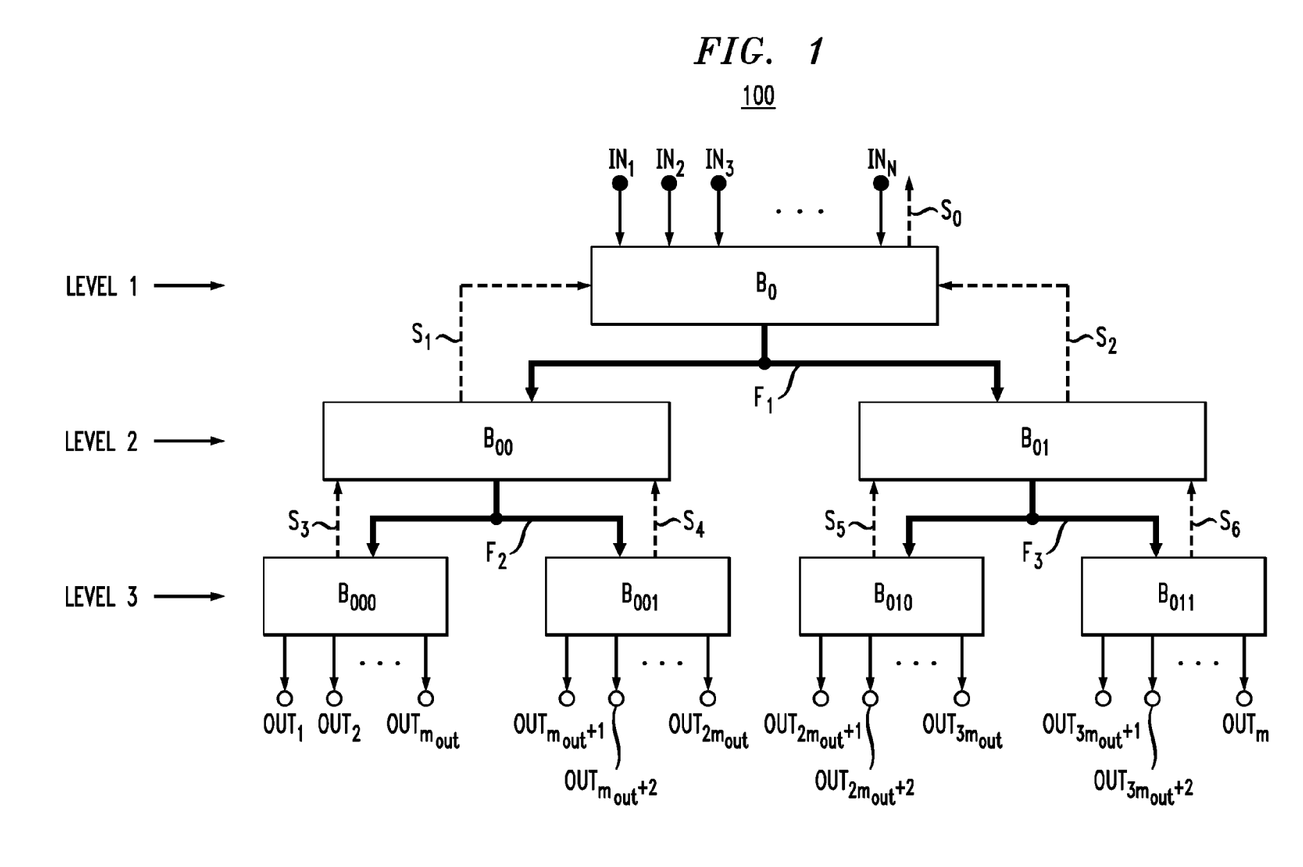
FIG. 1 shows a block diagram of a packet router according to one embodiment of the disclosure.

More specifically, FIG. 1 shows a block diagram of a packet router 100 according to one embodiment of the disclosure. As already indicated above, packet router 100 can, for example, be used to implement an interleaver or a de-interleaver for error-correction-coding (ECC) processing in a disk storage system and/or a computer memory. Other (e.g., optical) implementations of packet router 100 are also contemplated.

Packet router 100 has N input ports labeled $IN_1$-$IN_N$, where N is an integer greater than three. Packet router 100 further has M output ports labeled $OUT_1$-$OUT_M$, where M is a positive integer whose relationship with the number of input ports N and other structural parameters of the packet router is described in more detail below. For illustration purposes, packet router 100 is shown in FIG. 1 as having three hierarchical levels of buffer modules, with each buffer module being labeled by a capital letter "B" having a corresponding binary subscript. The subscript length (in bits) depends on the level number. For example, the subscript corresponding to Level 1 is one bit long. The subscript corresponding to Level 2 is two bits long, etc. In various alternative embodiments, the number of levels (L) in packet router 100 can be two or greater than three. In some embodiments, a maximum number of levels ($L_{max}$) that packet router 100 has is given by Eq. (1):

$$L_{max} = \lceil \log_2 M \rceil \qquad (1)$$

where the ceiling brackets denote the ceiling function (that rounds up to the nearest integer).

In the terminology used herein, the level number provides an indicator of the relative position of a buffer-module level within the level hierarchy. More specifically, the greater the level number, the higher the position within the level hierarchy. For example, in packet router 100, Level 3 is a "higher" level than Level 2 or Level 1. Level 1 is a "lower" level than Level 2 or Level 3. Level 2 is a "higher" level than Level 1, but a lower level than Level 3.

In one embodiment, each buffer module B in the last (highest) level is connected to the same number ($m_{out}$) of output ports. The relationship between the values of M and $m_{out}$ is given by Eq. (2):

$$M = 2^{L-1} m_{out} \qquad (2)$$

For example, in the embodiment shown in FIG. 1, L=3 and M=4$m_{out}$.

In an alternative embodiment, different buffer modules of the last level may be connected to different respective numbers of output ports OUT.

In general, each packet applied to an input port $IN_j$ of packet router 100 may have (i) a payload portion that carries W information bits and (ii) an address portion that carries up to $L_{max}$ address bits (also see Eq. (1)), with each of output ports $OUT_1$-$OUT_M$ being assigned a unique address. Hence, in each time slot, input ports $IN_1$-$IN_N$ of packet router 100 may receive a total maximum of N×W payload bits, whereas output ports $OUT_1$-$OUT_M$ may output a total maximum of M×W payload bits. As used herein, the term "time slot" refers to an internal time unit used in packet router 100 to synchronize and/or coordinate the operation of its various components. In various embodiments, a time slot can be a cycle of a common clock, a time period occupied by a modulated symbol, etc.

Each buffer module B of a lower (e.g., i-th) level in packet router 100 is connected to two corresponding buffer modules B in the immediately adjacent higher (e.g., (i+1)-th) level by a respective non-buffered interconnect fabric depicted in FIG. 1 by a respective branched solid line with two arrowheads. As used herein, the term "non-buffered" means that, when a data packet is transmitted from a buffer module in one level of packet router 100 to a buffer module in the next level of the packet router, a packet transit time through the corresponding interconnect fabric is shorter than a single time-slot duration.

In FIG. 1, the interconnect fabric that connects the buffer modules of the first and second levels is labeled $F_1$. The two interconnect fabrics that connect the buffer modules of the second and third levels are labeled $F_2$ and $F_3$. In a representative embodiment, interconnect fabrics $F_1$, $F_2$, and $F_3$ are analogous to one another and can be implemented as separate instances (copies) of the same physical device, circuit, or system. For example, in one embodiment, each of interconnect fabrics $F_1$, $F_2$, and $F_3$ can be implemented as a cross-connect switch. In another embodiment, each of interconnect fabrics $F_1$, $F_2$, and $F_3$ can be implemented as a sorting network. Representative examples of devices, circuits, and systems that can be used to implement interconnect fabrics $F_1$, $F_2$, and $F_3$ in various embodiments of packet router 100 are disclosed, e.g., in U.S. Pat. Nos. 8,171,186, 8,107,779, 8,093,922, 8,089,959, 8,006,024, 7,994,818, 7,603,509, 7,397,808, and 6,813,445, all of which are incorporated herein by reference in their entirety.

In the terminology used herein, Level 2 in packet router 100 is an intermediate level. With respect to the buffer modules in Level 2, interconnect fabric $F_1$ is an upstream interconnect fabric, and interconnect fabrics $F_2$ and $F_3$ are downstream interconnect fabrics. More specifically, for buffer module $B_{00}$, interconnect fabrics $F_1$ and $F_2$ are the upstream and downstream interconnect fabrics, respectively. Similarly, for buffer module $B_{01}$, interconnect fabrics $F_1$ and $F_3$ are the upstream and downstream interconnect fabrics, respectively.

Each buffer module B in packet router 100 comprises an array of memory cells (not explicitly shown in FIG. 1) configured to operate as a packet queue. In each time slot, each buffer module B can enqueue up to a first corresponding number of packets and dequeue up to a second corresponding number of packets. For example, buffer module $B_0$ in Level 1 of packet router 100 can enqueue up to N packets in each time slot. Each of buffer modules $B_{000}$, $B_{001}$, $B_{010}$, and $B_{011}$ in Level 3 of packet router 100 can dequeue up to $m_{out}$ packets in each time slot. The packet flow between different adjacent levels in packet router 100 depends on the throughput capacity of interconnect fabrics $F_1$, $F_2$, and $F_3$. Assuming that each of interconnect fabrics $F_1$, $F_2$, and $F_3$ can support the transport of up to n packets per time slot (where n is a positive integer), buffer module $B_0$ can dequeue up to n packets in each time slot. Each of buffer modules $B_{00}$ and $B_{01}$ in Level 2 of packet router 100 can (i) enqueue up to n packets in each time slot and (ii) dequeue up to n packets in each time slot. Each of buffer modules $B_{000}$, $B_{001}$, $B_{010}$, and $B_{011}$ in Level 3 of packet router 100 can enqueue up to n packets in each time slot. In any particular time slot, each buffer module B may be able to enqueue/dequeue fewer than the above-indicated number(s) of packets, for example, when one or more of the following conditions apply to that buffer module: (i) buffer module B has an insufficient available storage space for receiving packets; (ii) one or both of the buffer modules to which buffer module B is directly connected in the higher level of packet router 100 has an insufficient available storage space for receiving packets from buffer module B; and (iii) two or more enqueued packets in buffer module B contend for the same output port.

In one embodiment, each buffer module B generates a respective backpressure signal $S_i$, which is asserted when the buffer module is unable to accommodate a set of additional packets. In the embodiment of packet router 100 shown in FIG. 1, seven such backpressure signals, labeled $S_0$-$S_6$, may be asserted. Backpressure signal $S_0$ is asserted when buffer module $B_0$ is unable to accommodate a set of additional packets directed to it via input ports $IN_1$-$IN_N$. Backpressure signal $S_1$ is asserted when buffer module $B_{00}$ is unable to accommodate a set of additional packets from buffer module $B_0$. Backpressure signal $S_2$ is asserted when buffer module $B_{01}$ is unable to accommodate a set of additional packets from buffer module $B_0$. Backpressure signal $S_3$ is asserted when buffer module $B_{000}$ is unable to accommodate additional a set of packets from buffer module $B_{00}$, and so on.

Figure 2:
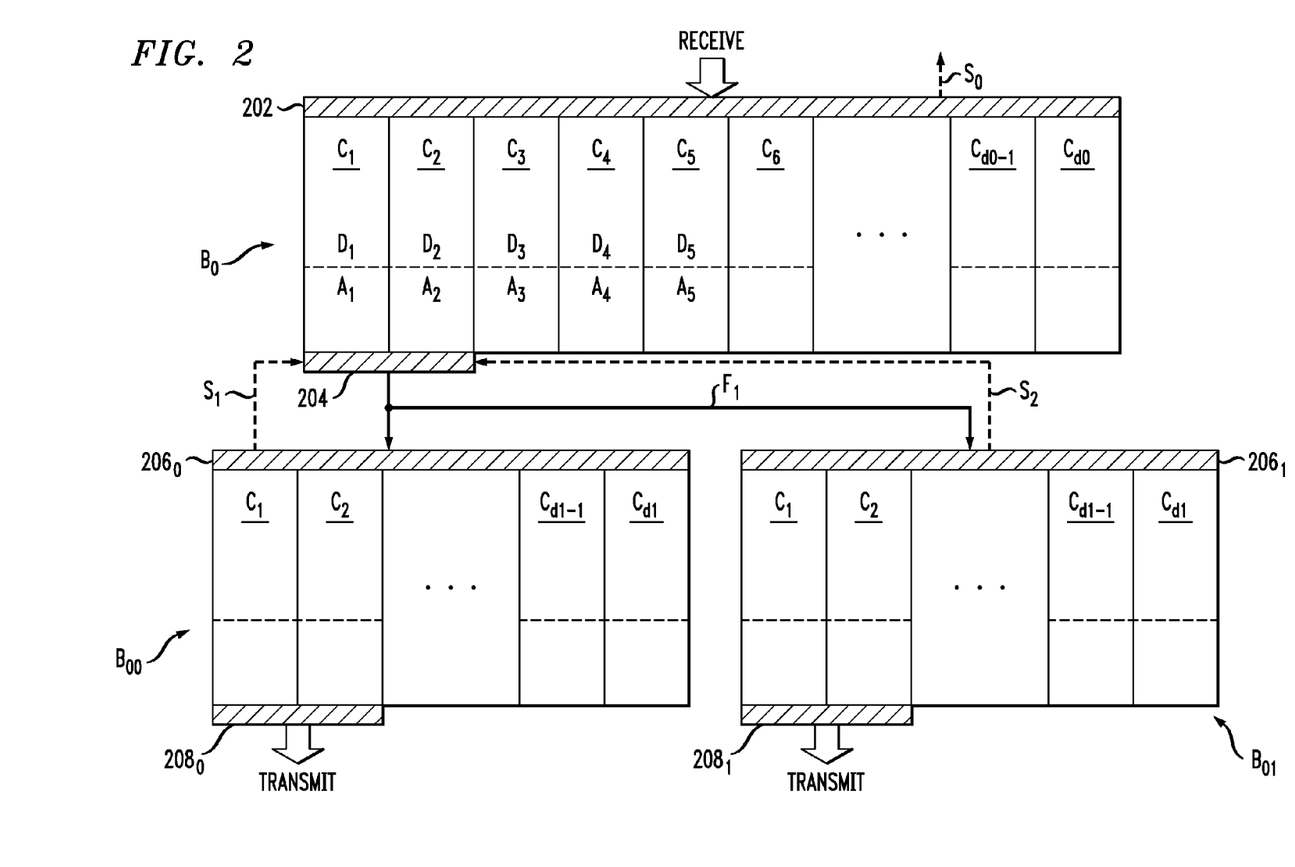
FIG. 2 shows a block diagram illustrating packet flow in three interconnected buffer modules in the packet router shown in FIG. 1 according to one embodiment of the disclosure.

FIG. 2 shows a block diagram illustrating packet flow in buffer modules $B_0$, $B_{00}$, and $B_{01}$ in packet router 100 according to one embodiment of the disclosure. For illustration purposes, the packet flow is described under the assumption that interconnect fabric $F_1$ is designed to transport a maximum of two packets per time slot (i.e., n=2) from buffer module $B_0$ to buffer modules $B_{00}$ and $B_{01}$. From the provided description, one of ordinary skill in the art will understand packet flow between any three interconnected buffer modules in arbitrary l-th and (l+1)-th levels of a packet router having an architecture that is analogous to the hierarchical architecture of packet router 100 and will be able to make and use an embodiment of such a packet router when the packet router employs interconnect fabrics designed to transport a different maximum number of packets per time slot (e.g., n≠2).

Buffer module $B_0$ has a chain of serially connected memory cells $C_1$-$C_{d0}$ that, in each time slot, can shift packets along the chain, from right to left, in a manner similar to that of a conventional unidirectional shift register. More specifically, when memory cell $C_i$ in buffer module $B_0$ is read out, the packet (if any) saved in memory cell $C_{i+1}$ is shifted to memory cell $C_i$; the packet (if any) saved in memory cell $C_{i+2}$ is shifted to memory cell $C_{i+1}$; the packet (if any) saved in memory cell $C_{i+3}$ is shifted to memory cell $C_{i+2}$, and so on. As indicated in FIG. 2, each memory cell $C_i$ has a first partition configured to store payload bits (D) of a packet and a second partition configured to store a destination address (A) of that packet. When packet router 100 functions as an interleaver or a de-interleaver, address $A_i$ of each packet received by the packet router has been generated by an interleave-address generator (not explicitly shown in FIGS. 1 and 2) that generates addresses, as known in the art, in accordance with the operative interleave algorithm. Representative interleave-address generators that can be used for this purpose in conjunction with packet router 100 are disclosed, e.g., in U.S. Pat. Nos. 6,748,560, 6,507,629, and 6,321,311, all of which are incorporated herein by reference in their entirety.

Buffer module $B_0$ further has an input interface 202 configured to write the received packets into the available memory cells of buffer module $B_0$. More specifically, when backpressure signal $S_0$ is not asserted, input interface 202 writes a set of received packets into a corresponding set of empty memory cells that follow the last filled memory cell in the memory-cell chain of buffer module $B_0$. For example, FIG. 2 illustratively shows a situation in which the last filled memory cell in the memory-cell chain of buffer module $B_0$ is memory cell $C_5$, with each of memory cells $C_1$-$C_5$ containing a respective packet indicated by the address/payload tuple $(A_k,D_k)$, where k=1, 2, . . . , 5. In this situation, memory cell $C_5$ represents the end of the packet queue in buffer module $B_0$. Suppose now that input interface 202 receives three packets while the packets saved in memory cells $C_1$-$C_5$ are not being moved. Then, the received packets will be written into memory cells $C_6$-$C_8$, respectively. After the write-in is completed, memory cell $C_8$ becomes the end of the packet queue in buffer module $B_0$.

Buffer module $B_0$ further has an output interface 204 configured to send the packets saved in memory cells $C_1$ and $C_2$, via interconnect fabric $F_1$, to buffer modules $B_{00}$ and $B_{01}$. More specifically, if neither of backpressure signals $S_1$ and $S_2$ is asserted, then, depending on the destination addresses of the packets saved in memory cells $C_1$ and $C_2$, output interface 204 may (i) send both packets to buffer module $B_{00}$; or (ii) send both packets to buffer module $B_{01}$; or (iii) send one packet to buffer module $B_{00}$ and one packet to buffer module $B_{01}$. If backpressure signal $S_1$ is not asserted, but backpressure signal $S_2$ is asserted, then, depending on the destination addresses of the packets saved in memory cells $C_1$ and $C_2$, output interface 204 may (i) send both packets to buffer module $B_{00}$ or (ii) send only one packet to buffer module $B_{00}$. Similarly, if backpressure signal $S_2$ is not asserted, but backpressure signal $S_1$ is asserted, then, depending on the destination addresses of the packets saved in memory cells $C_1$ and $C_2$, output interface 204 may (i) send both packets to buffer module $B_{01}$ or (ii) send only one packet to buffer module $B_{01}$.

In the embodiment shown in FIG. 2, memory cells $C_1$ and $C_2$ represent the head of the packet queue in buffer module $B_0$. In general, the size of the head of the packet queue is directly related to the size of the corresponding output interface. More specifically, if the output interface is designed to read out data packets from any of the m left-most memory cells of the buffer module, then the head of the packet queue has a size of m.

When the first bit of a packet's destination address is "zero," output interface 204 is configured to direct that packet, via interconnect fabric $F_1$, to buffer module $B_{00}$. After the packet arrives at buffer module $B_{00}$, the latter modifies the packet's destination address by removing the most significant bit (MSB) of the address, thereby shortening the length of the destination address by one bit. This feature of packet router 100 may be beneficial, e.g., because it enables buffer module $B_{00}$ to employ memory cells of smaller capacity than that in buffer module $B_0$.

When the first bit of a packet's destination address is "one," output interface 204 is configured to direct that packet, via interconnect fabric $F_1$, to buffer module $B_{01}$. After the packet arrives at buffer module $B_{01}$, the latter modifies the packet's destination address by removing the MSB of the address, thereby shortening the length of the destination address by one bit. This feature of packet router 100 may similarly be beneficial, e.g., because it enables buffer module $B_{01}$ to employ memory cells of smaller capacity than that in buffer module $B_0$.

When one or both of the packets saved in memory cells $C_1$ and $C_2$ of buffer module $B_0$ are sent out, the remaining packets located to the right of the read-out memory cell(s) in the head of the queue advance to the left by one or two positions so that the chain of the occupied memory cells is continuous and does not have any gaps within it. This advancement causes the enqueued packets to move into or closer to the head of the packet queue in buffer module $B_0$.

For example, if both packets $(A_1,D_1)$ and $(A_2,D_2)$ are sent out, then (i) packet $(A_3,D_3)$ advances from memory cell $C_3$ to memory cell $C_1$; (ii) packet $(A_4,D_4)$ advances from memory cell $C_4$ to memory cell $C_2$; and (iii) packet $(A_5,D_5)$ advances from memory cell $C_5$ to memory cell $C_3$. If input interface 202 also receives a set of new packets in that time slot, then those new packets are saved in a corresponding continuous set of memory cells in buffer module $B_0$, starting with memory cell $C_4$.

As another example, if only packet $(A_1,D_1)$ is sent out, then (i) packet $(A_2,D_2)$ advances from memory cell $C_2$ to memory cell $C_1$; (ii) packet $(A_3,D_3)$ advances from memory cell $C_3$ to memory cell $C_2$; (iii) packet $(A_4,D_4)$ advances from memory cell $C_4$ to memory cell $C_3$; and (iv) packet $(A_5,D_5)$ advances from memory cell $C_5$ to memory cell $C_4$. If input interface 202 also receives a set of new packets in that time slot, then those new packets are saved in a corresponding continuous set of memory cells in buffer module $B_0$, starting with memory cell $C_5$.

As yet another example, if only packet $(A_2,D_2)$ is sent out, then (i) packet $(A_1,D_1)$ stays in memory cell $C_1$; (ii) packet $(A_3,D_3)$ advances from memory cell $C_3$ to memory cell $C_2$; (iii) packet $(A_4,D_4)$ advances from memory cell $C_4$ to memory cell $C_3$; and (iv) packet $(A_5,D_5)$ advances from memory cell $C_5$ to memory cell $C_4$. If input interface 202 also receives a set of new packets in that time slot, then those new packets are saved in a corresponding continuous set of memory cells in buffer module $B_0$, starting with memory cell $C_5$.

Each of buffer modules $B_{00}$ and $B_{01}$ operates similar to buffer module $B_0$. More specifically, each of buffer modules $B_{00}$ and $B_{01}$ has a respective chain of serially connected memory cells $C_1$-$C_{d1}$ that can shift packets in the chain from right to left. Note that, in various embodiments, d1 (the number of memory cells in each of buffer modules $B_{00}$ and $B_{01}$) may be the same as or different from d0 (the number of memory cells in buffer module $B_0$). In some embodiments, the number of memory cells in buffer module $B_{00}$ may differ from the number of memory cells in buffer module $B_{01}$. Each of buffer modules $B_{00}$ and $B_{01}$ further has a respective input interface 206 and a respective output interface 208, each operating similar to input interface 202 and output interface 204, respectively, of buffer module $B_0$.

Although each of input interfaces 202 and 206 is shown in FIG. 2 as being coupled to and configured to load received packets into any memory cell of the corresponding buffer module, alternative embodiments are also contemplated. For example, in one embodiment, an input interface analogous to any one of input interfaces 202 and 206 can be coupled to and configured to load received packets into a specified number (e.g., two or any other number smaller than $d_i$) of memory cells located at the ("right") end of the corresponding buffer module. The packets loaded in at the "right" end of the buffer module are then properly moved along the chain of memory cells toward the "left" end of the buffer module to remove any possible gaps in the queue of packets therein.

In general, the packet-router architecture exemplified by packet router 100 has an advantageous characteristic of enabling the packet-router designer to realize any desired trade-off between the router's performance characteristics and the router's implementation complexity. For example, the fact that buffer modules in different levels of the packet router have the same parameterized structure (although the use of different level-specific parameters is still possible) significantly streamlines the design process in general and the RTL (register-transfer level) models of buffer modules in particular. Furthermore, the packet-router designer has remarkable flexibility in choosing a suitable implementation of interconnect fabrics for connecting the appropriate buffer modules in adjacent packet-router levels to one another. For example, by limiting the number of packets that an interconnect fabric can transmit per time slot to a relatively small value, the relative implementation complexity of the interconnect fabrics can be in a low-to-moderate range.

While this invention has been described with reference to illustrative embodiments, this description is not intended to be construed in a limiting sense.

For example, it is useful in general to configure a packet router to remove the MSB of the (present) routing address while moving packets to progressively higher levels within the router. As already indicated above, this feature may be beneficial because it enables the buffer modules in the higher levels of the packet router to have progressively smaller space for the storage of destination addresses.

In some embodiments, an act of "transmitting" a packet is implemented by not moving the payload of the packet from its physical storage location, but rather by manipulating pointers identifying that physical storage location, e.g., by moving the pointers through an interconnect structure.

In some embodiments, a packet router can be implemented using a hierarchy of buffer levels in which (i) an interconnect fabric analogous to any one of interconnect fabrics $F_1$, $F_2$, and $F_3$ is configured to connect one buffer module of a lower level to four, eight, or sixteen, etc., buffer modules of the next higher level and (iii) two, three, or four MSBs, respectively, are used to route packets from said lower level to said next higher level.

As used herein, the terms "terminal memory cell" and "terminal position" refer to a memory cell that is analogous to memory cell $C_1$ in any of buffer modules $B_0$, $B_{00}$, and $B_{01}$ shown in FIG. 2. One skilled in the art will appreciate that memory cell $C_1$ is characterized in that (i) it represents the most "advanced" position in the packet queue and (ii) a packet stored in memory cell $C_1$ is normally removed from it only through the corresponding output interface, such as one of output interfaces 204 or 208, rather than by being shifted to another memory cell within the same buffer module.

According to one embodiment, a packet router may include: an input buffer module configured to receive packets from a set of input ports; a set of output buffer modules, each configured to direct packets stored therein to a respective set of output ports; and one or more interconnect fabrics configured to transport packets between the input buffer module and the set of the output buffer modules. Each of said one or more interconnect fabrics is disposed between a respective first buffer module, a respective second buffer module, and a respective third buffer module and is configured to transport packets from said respective first buffer module to said respective second and third buffer modules. Said respective first buffer module is configured to: enqueue packets at an end of a queue therein in an order of their arrival to said respective first buffer module; dequeue packets from a head of the queue; and advance packets toward the head of the queue when the first buffer module dequeues one or more packets from the head of the queue and transmits the one or more dequeued packets, via the interconnect fabric, to at least one of said respective second buffer module and said respective third buffer module.

In some embodiments of the above packet router, the packet router comprises a first interconnect fabric configured to transport packets from the input buffer module directly to a first output buffer module and a second output buffer module in said set of the output buffer modules.

In some embodiments of any of the above packet routers, the packet router further includes a plurality of intermediate buffer modules, wherein an intermediate buffer module of said plurality is configured to: receive, via a respective upstream interconnect fabric, packets from a buffer module in a next lower level; and transmit, via a respective downstream interconnect fabric, packets to a respective pair of buffer modules in a next higher level.

In some embodiments of any of the above packet routers, the head of the queue includes two or more positions; and said respective first buffer module is configured to dequeue packets from any position within the head of the queue.

In some embodiments of any of the above packet routers, said respective first buffer module is configured to dequeue a packet currently located in a non-terminal position in the head of the queue before before dequeueing a packet currently located in a terminal position in the head of the queue.

In some embodiments of any of the above packet routers, said respective first buffer module is configured to advance packets in the queue to fill one or more gaps formed by the dequeued packets and without forming other gaps in the queue.

In some embodiments of any of the above packet routers, said respective first buffer module is configured to dequeue, from the head of the queue, two or more packets per time slot.

In some embodiments of any of the above packet routers, each enqueued packet has a destination address; and said respective first buffer module is configured to: transmit an enqueued packet to said respective second buffer module if the most significant bit (MSB) in the packet's destination address has a first binary value; and transmit the enqueued packet to said respective third buffer module if the MSB in the packet's destination address has a second binary value different from the first binary value.

In some embodiments of any of the above packet routers, each of said respective second buffer module and said respective third buffer module is configured to: enqueue received packets at an end of a respective queue therein in an order of their arrival to the buffer module; and shorten the received packet's destination address by removing the MSB.

In some embodiments of any of the above packet routers, each of said respective second buffer module and said respective third buffer module is configured to: enqueue received packets at an end of a respective queue therein in an order of their arrival to the buffer module; and dequeue enqueued packets from a head of said respective queue; and advance enqueued packets toward the head of said respective queue when the buffer module dequeues one or more of the enqueued packets from the head of said respective queue.

In some embodiments of any of the above packet routers, for each of the respective first, second, and third buffer modules, the packet router further includes: a respective first signal path for transmitting a first backpressure signal from the respective second buffer module to the respective first buffer module, said first backpressure signal being asserted when the respective second buffer module has insufficient space for receiving packets from the respective first buffer module; and a respective second signal path for transmitting a second backpressure signal from the respective third buffer module to the respective first buffer module, said second backpressure signal being asserted when the respective third buffer module has insufficient space for receiving packets from the respective first buffer module.

In some embodiments of any of the above packet routers, when the first backpressure signal is asserted, the respective first buffer module is configured to transmit packets, via the interconnect fabric, to the respective third buffer module, but not to the respective second buffer module.

In some embodiments of any of the above packet routers, the respective first buffer module is configured to transmit, via the interconnect fabric, to the respective third buffer module two or more packets per time slot.

In some embodiments of any of the above packet routers, the packet router is configured to implement an interleaver or a de-interleaver.

In some embodiments of any of the above packet routers, said interleaver or de-interleaver is part of a circuit configured to perform error-correction-coding processing in a data-storage device.

In some embodiments of any of the above packet routers, at least one of said one or more interconnect fabrics is configured to transport packets therethrough using an optical carrier wave.

According to another embodiment, a packet router may include: a plurality of buffer modules arranged into a plurality of hierarchical buffer levels; and one or more interconnect fabrics, each disposed between a respective first buffer module, a respective second buffer module, and a respective third buffer module and configured to transport packets from said respective first buffer module to said respective second and third buffer modules. A higher hierarchical buffer level has more buffer modules than a corresponding lower hierarchical buffer level. In each set of three buffer modules comprising said respective first buffer module, said respective second buffer module, and said respective third buffer module: said respective second buffer module and said respective third buffer module belong to a common hierarchical buffer level; and said respective first buffer module belongs to a hierarchical buffer level that is one level lower than said common hierarchical buffer level.

In some embodiments of the above packet router, each of said respective first, second, and third buffer modules is configured to: enqueue packets at an end of a respective queue therein in an order of their arrival to said respective buffer module; dequeue packets from a head of the respective queue; and advance packets toward the head of the respective queue when the respective buffer module dequeues one or more packets from the head of the respective queue and transmits the one or more dequeued packets to at least one buffer module in a next higher hierarchical buffer level or to a respective set of output ports connected to the buffer module.

According to yet another embodiment, a packet-routing method comprises transporting packets using a plurality of buffer modules arranged into a plurality of hierarchical buffer levels, wherein: a higher hierarchical buffer level has more buffer modules than a corresponding lower hierarchical buffer level; and said transporting comprises: in each set of three buffer modules that comprises a respective first buffer module, a respective second buffer module, and a respective third buffer module, enqueueing a respective subset of the packets in a packet queue at said respective first buffer module; transmitting a packet of said respective subset of the packets, through a respective interconnect fabric, to said respective second buffer module or said respective third buffer module, when said packet reaches a head of the packet queue in said respective first buffer module; and enqueueing respective received packets in respective packet queues at said respective second buffer module and said respective third buffer module, wherein: said respective second buffer module and said respective third buffer module belong to a common hierarchical buffer level; and said respective first buffer module belongs to a hierarchical buffer level that is one level lower than said common hierarchical buffer level.

Various modifications of the described embodiments, as well as other embodiments of the invention, which are apparent to persons skilled in the art to which the invention pertains are deemed to lie within the principle and scope of the invention as expressed in the following claims.

The disclosed embodiments may be implemented as circuit-based processes, including possible implementation on a single integrated circuit.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Various possible embodiments may be in the form of other specific apparatus and/or methods. The described embodiments are to be considered in all respects as only illustrative and not restrictive. In particular, the scope is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media, such as magnetic disks or tapes, hard drives, or optically readable digital data storage media.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles and the concepts contributed by the listed inventor(s) to furthering the art, and are to be construed as being without limitation to such specifically recited examples and conditions. Moreover, all statements herein reciting principles, aspects, and embodiments, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

What is claimed is:

1. An apparatus comprising a packet router that includes:
   an input buffer module configured to receive packets from a set of input ports;
   a set of output buffer modules, each configured to direct packets stored therein to a respective set of output ports; and
   one or more interconnect fabrics configured to transport packets from the input buffer module to the set of the output buffer modules, wherein:
   each of said one or more interconnect fabrics is disposed to couple a respective first buffer module, a respective second buffer module, and a respective third buffer module and is configured to transport packets from said respective first buffer module to at least one of said respective second and third buffer modules; and
   said respective first buffer module is configured to:
      enqueue packets at an end of a queue therein in an order of their arrival to said respective first buffer module;
      dequeue packets from a head of the queue;
      advance packets toward the head of the queue when the first buffer module dequeues one or more packets from the head of the queue and transmits the one or more dequeued packets, via the interconnect fabric, to at least one of said respective second buffer module and said respective third buffer module;
      wherein each enqueued packet has a destination address, transmit the enqueued packet to said respective second buffer module if a most significant bit in the enqueued packet's destination address has a first binary value;
      transmit the enqueued packet to said respective third buffer module if the most significant bit in the enqueued packet's destination address has a second binary value different from the first binary value,
   wherein each of said respective second buffer module and said respective third buffer module is configured to:
      enqueue received packets at an end of a respective queue therein in an order of their arrival to the buffer module; and
      shorten each enqueued received packet's destination address by removing the most significant bit.

2. The apparatus of claim 1, wherein the packet router comprises a first interconnect fabric configured to transport packets from the input buffer module directly to a first output buffer module and a second output buffer module in said set of the output buffer modules.

3. The apparatus of claim 1, wherein the packet router further includes a plurality of intermediate buffer modules, wherein an intermediate buffer module of said plurality is configured to:
   receive, via a respective upstream interconnect fabric, packets from a buffer module in a next lower level; and
   transmit, via a respective downstream interconnect fabric, packets to a respective pair of buffer modules in a next higher level.

4. The apparatus of claim 1, wherein:
   the head of the queue includes two or more positions; and
   said respective first buffer module is configured to dequeue packets from any position within the head of the queue.

5. The apparatus of claim 4, wherein said respective first buffer module is configured to dequeue a packet currently located in a non-terminal position in the head of the queue before dequeueing a packet currently located in a terminal position in the head of the queue.

6. The apparatus of claim 4, wherein said respective first buffer module is configured to advance packets in the queue to fill one or more gaps formed by the dequeued packets and without forming other gaps in the queue.

7. The apparatus of claim 4, wherein said respective first buffer module is configured to dequeue, from the head of the queue, two or more packets per time slot.

8. The apparatus of claim 1, wherein each of said respective second buffer module and said respective third buffer module is configured to:
   enqueue received packets at an end of a respective queue therein in an order of their arrival to the buffer module; and
   dequeue enqueued packets from a head of said respective queue; and
   advance enqueued packets toward the head of said respective queue when the buffer module dequeues one or more of the enqueued packets from the head of said respective queue.

9. The apparatus of claim 1, wherein, for each of the respective first, second, and third buffer modules, the packet router further includes:
   a respective first signal path for transmitting a first backpressure signal from the respective second buffer module to the respective first buffer module, said first backpressure signal being asserted when the respective second buffer module has insufficient space for receiving packets from the respective first buffer module; and
   a respective second signal path for transmitting a second backpressure signal from the respective third buffer module to the respective first buffer module, said second backpressure signal being asserted when the respective third buffer module has insufficient space for receiving packets from the respective first buffer module.

10. The apparatus of claim 9, wherein, when the first backpressure signal is asserted, the respective first buffer module is configured to transmit packets, via the interconnect fabric, to the respective third buffer module, but not to the respective second buffer module.

11. The apparatus of claim 9, wherein the respective first buffer module is configured to transmit, via the interconnect fabric, to the respective third buffer module two or more packets per time slot.

12. The apparatus of claim 1, wherein the packet router is configured to implement an interleaver or a de-interleaver.

13. The apparatus of claim 12, wherein said interleaver or de-interleaver is part of a circuit configured to perform error-correction-coding processing in a data-storage device.

14. The apparatus of claim 1, wherein at least one of said one or more interconnect fabrics is configured to transport packets therethrough using an optical carrier wave.

* * * * *